United States Patent
Komolrochanaporn

[19]

[11] Patent Number: 5,957,509
[45] Date of Patent: Sep. 28, 1999

[54] PIPE COUPLING

[76] Inventor: Naris Komolrochanaporn, 119 Soi Wat suthavas, Bangkok, Thailand

[21] Appl. No.: 09/173,785

[22] Filed: Oct. 16, 1998

[51] Int. Cl.⁶ .................................................. F16L 19/08
[52] U.S. Cl. ....................................... 285/382.7; 285/343
[58] Field of Search ................................ 285/343, 382.7, 285/339, 341

[56] References Cited

U.S. PATENT DOCUMENTS

| | | | |
|---|---|---|---|
| 1,646,660 | 10/1927 | Prince | 285/343 |
| 2,412,664 | 12/1946 | Wolfram et al. | 285/343 |
| 2,508,763 | 5/1950 | Mercier | 285/285.7 |
| 2,640,716 | 6/1953 | Bigelow | 285/385.7 |
| 2,758,852 | 8/1956 | Newell | 285/343 |
| 3,107,108 | 10/1963 | Greene | 285/382.7 |
| 3,180,664 | 4/1965 | Franck | 285/343 |
| 3,248,135 | 4/1966 | Meripol | 285/343 |
| 3,498,647 | 3/1970 | Schroder | 285/343 |
| 3,684,322 | 8/1972 | Kotsakis | 285/343 |
| 4,025,093 | 5/1977 | Leczycki | 285/343 |
| 4,138,145 | 2/1979 | Lawrence | 285/343 |
| 4,776,618 | 10/1988 | Barree | 285/341 |
| 5,466,019 | 11/1995 | Komolrochanaporn | 385/343 |

Primary Examiner—Eric K. Nicholson
Attorney, Agent, or Firm—Jack C. Munro

[57] ABSTRACT

A pipe coupling for joining separate segments of pipe together in a fluid tight manner. A connector is fixedly secured to one pipe section with a retaining nut being removably mounted on the remaining pipe section. A retaining nut is threadably secured to a spool section with this spool section being threadably secured to the connector. In between the retaining nut and the pipe section there is located a grab ring. This grab ring includes a plurality of biting members. The grab ring can either constitute a split ring or can comprise an annular base ring which is fixed in size which has a plurality of deflectable settings mounted thereon. When the spool section is tightened, the retaining nut and the connector move closer together with an inclined configuration of wedge ring being forced to cause the grab ring to move toward the pipe section on which it is mounted with the biting members imbedding into the wall surface of the pipe section thereby longitudinally fixing the position of the pipe section relative to the retaining nut and maintaining a fluid tight relationship.

4 Claims, 3 Drawing Sheets

PIPE COUPLING

BACKGROUND OF THE INVENTION

1) Field of the Invention

The field of this invention relates to pipes and more particularly to a coupling for different sections of pipe which are to be connected together in a fluid tight manner without requiring welding, soldering, or other conventional types of permanent securing techniques.

2) Description of the Prior Art

Plastic pipe and metal pipe have long been used for the conveying of fluids such as liquids and gases. These pipes include fittings with these fittings being utilized to connect together aligned different sections of pipe. These fittings must be capable of providing a fluid tight seal over a range of temperatures, pressures and a variety of exterior ambient conditions. Specifically for plastic pipe, a reliable coupling is difficult due to stress causing fatigue, stretching or failure of the plastic pipe that will result in leaking of the coupling from an inadequate seal. Couplings used in plastic pipe must be able to withstand axial stresses such as those caused by temperature induced length variations without a decrease in sealing capabilities. In addition, pipe couplings should be easily connectable by ordinary workers that don't require any special skill in order to install the coupling.

Pipe couplings are currently available in many different configurations. The typical coupling includes a body or connector portion into which an open end of a section of pipe is inserted and fixedly secured within that connector. A retaining nut is movably mounted on another section of the pipe with its open end to then be located within the confines of the connector. The retaining nut is then threaded onto the connector. Included within the connector and encircling the pipe are one or more elastic sealing rings, one or more washers, and a grab ring for longitudinally fixing in position the pipe section that has been inserted within the connector. Tightening of the retaining nut onto the connector forces the grab ring to compress radially inward to grip the wall surface of the pipe and also provide longitudinal pressure against the sealing rings to compress such forming of a fluid tight seal between the exterior wall surface of the pipe and the interior of this coupling. In the past, typical coupling designs included a grab ring that must be initially expanded or radially expanded during insertion of the pipe so as to fit around and grip the pipe. This initial radial expansion makes insertion of the pipe more difficult and creates a locking condition that prevents withdrawal of the pipe except by disassembling of the coupling even though the retaining nut has not been tightened.

The present inventor has acquired prior U.S. Pat. No. 5,466,019 directed to a similar type of pipe coupling. One of the disadvantages of this prior art type of pipe coupling was that it included a substantial number of parts. It would be desirable to eliminate some of those parts. Additionally, this prior art type of pipe coupling included a compressible rubber washer which functioned to exert a biasing force against biting members which functioned to dig into the pipe in order to maintain the desired fluid tight connection between the pipe sections. However, it has been discovered that over a period of time this rubber washer will tend to take a set and lose its biasing force which results in an inferior type of connection. Additionally, the pipe coupling of the aforementioned patent had the further disadvantage in that it required the retaining nut to be tightened onto the connector of the pipe coupling. The retaining nut also supports the pipe section into which the biting members of the pipe coupling are to imbed. This rotation of that retaining nut produced grooves of the biting members into the pipe section rather than merely digging into the pipe section. It would be desirable to find a way to tighten the pipe coupling which eliminated the need for rotation of this retaining nut.

SUMMARY OF THE INVENTION

A pipe coupling which utilizes a connector which is fixedly secured onto a first section of pipe. This connector includes an internal bore which is surrounded by an internally threaded section. Threadably secured within this internally threaded section is one end of a spool section with the opposite end of the spool section to be threadably connected within a retaining nut. In between the retaining nut and the pipe section is located a backup ring, a wedge ring and a grab ring. The grab ring includes biting members with these biting members to be forced into engagement with the pipe section. This forcing of the biting members into engagement is accomplished by an annular inclined section of the wedge ring being forced between the backup ring and the grab ring during lineal movement between the retaining nut and the connector. The grab ring can comprise either a split ring or a fixed ring which functions as a split ring with a series of slots which form a pair of deflectable fingers.

One of the primary objectives of the present invention is to construct a pipe coupling that is usable for both plastic pipe and metal pipe for joining aligned sections of such pipe in a fluid tight manner.

Another objective of the present invention is to construct a pipe coupling which can be easily installed with simple tools not requiring any special skills by the installer.

Another objective of the present invention is to construct a pipe coupling which uses a wedge ring which has an annular, inclined main section which functions as a biasing means for biting members that bite into a section of pipe eliminating the need of a rubber type of biasing member.

DETAILED DESCRIPTION OF THE PREFERRED EMBODIMENT

Figure 2:
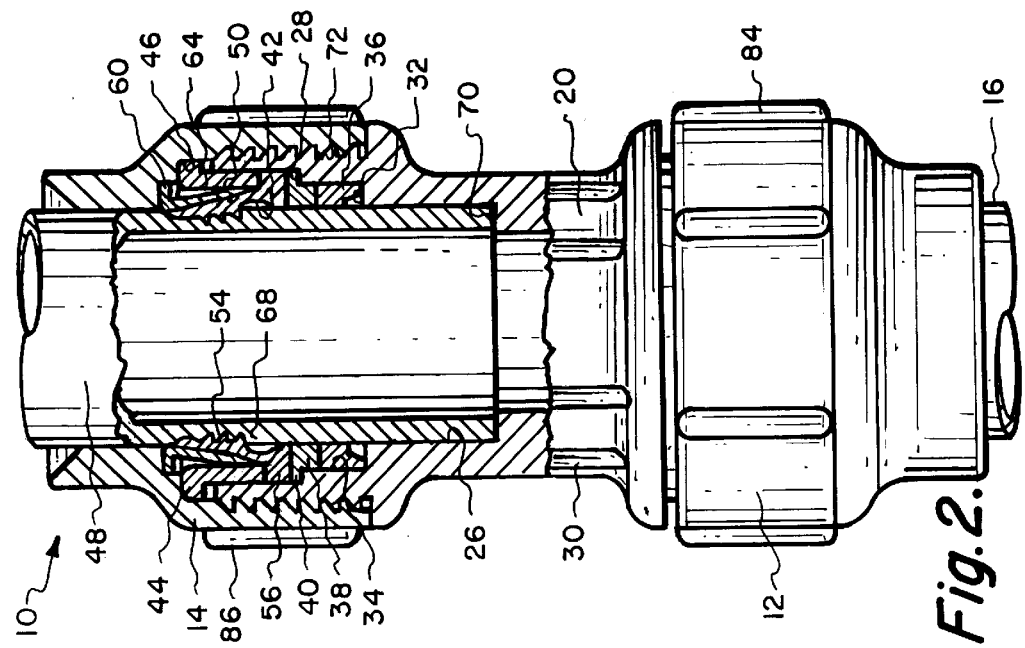
FIG. 2 is a view similar to FIG. 1 but showing the pipe coupling in the tightened position thereby fixing in position the movable pipe section relative to the coupling.

Referring particularly to the drawings there is shown the pipe coupling 10 of this invention which is generally composed of a connector 12 and a retaining nut 14. Connector 12 is basically hollow and is open at each end. Fixedly mounted within the lower end of, the connector 12 is a first section 16 of pipe. This section 16 of pipe can comprise either plastic or metal. The diameter of the pipe 16 could be from one inch or less or could be as great as foot or more. The first section 16 is fixedly secured as by an adhesive to the connector 12. The connector 12 also includes an internally threaded section 18 formed within its upper end.

A spool section 20 terminates in externally threaded sections 22 and 24. The spool section 20 is basically the configuration of a pipe having an internal through passage 26. Externally threaded section 22 is to threadingly connect with the internally threaded section 18. It is to be noted that the externally threaded sections 22 and 24 are to be oppositely threaded, for example, externally threaded section 22 comprising a series of left hand threads while externally threaded section 24 comprising a series of right hand threads. Formed within the internal through passage 26 is an annular ledge 28, the function of which will be explained further on in the specification. The spool section 20 has exteriorly mounted thereon a plurality of ridges 30. The function of the ridges will be explained further on in the specification. The internal through passage 26 also includes second annular ledge 32. In between the ledge 28 and the ledge 32 there is defined an annular chamber 34. Within the annular chamber 34 is to be located a circular shaped sealing member 36. The sealing member is to abut against the ledge 32. Also mounted against the sealing member 36 is a washer 38. The washer 38 has an annular flange 40 which rests against the ledge 28. The portion of the internal through passage 26 from the ledge 28 to the outer end of the spool section 20 defines an enlarged annular chamber 42. Generally the sealing member 36 will be constructed of a slightly resilient material such as a plastic or possibly even a rubberized plastic. The washer 38 may be either plastic or metal.

Mounted within the enlarged annular chamber 42 is a back-up ring 44 which is to be partially located within the enlarged annular chamber 42 and also have an enlarged annular flange which is mounted within internal chamber 46 of the retaining nut 14. The back-up ring 44 abuts directly adjacent the wall surface of the enlarged annular chamber 42. In between the back-up ring 44 and a second pipe section 48 is a grab ring 50. The bottom flange of the grab ring 50 rests against the washer 38. Grab ring 50 has a longitudinal split 52. The function of the split 52 will be explained further on in the specification. The internal surface of the grab ring 50 includes a plurality of biting members 54. These biting members 54 are basically rings with there being three in number of these rings. The only thing that keeps the rings from being continuous is the split 52. The lower end of the back-up ring 44 rests against the annular base flange 56 of the grab ring 50. This annular base flange 56 is what rests directly against the annular flange 40 of the washer 38.

Formed within the retaining nut 14 is an annular compartment 58 which connects to the internal chamber 46. Within the annular compartment 58 is mounted the head section 60 of a wedge ring 62. The wedge ring 62 also includes a main section 64. This main section 64 is inclined relative to the longitudinal center axis 66. The lower or outer edge of the main section 64 is formed into a sharpened edge 68.

Figure 1:
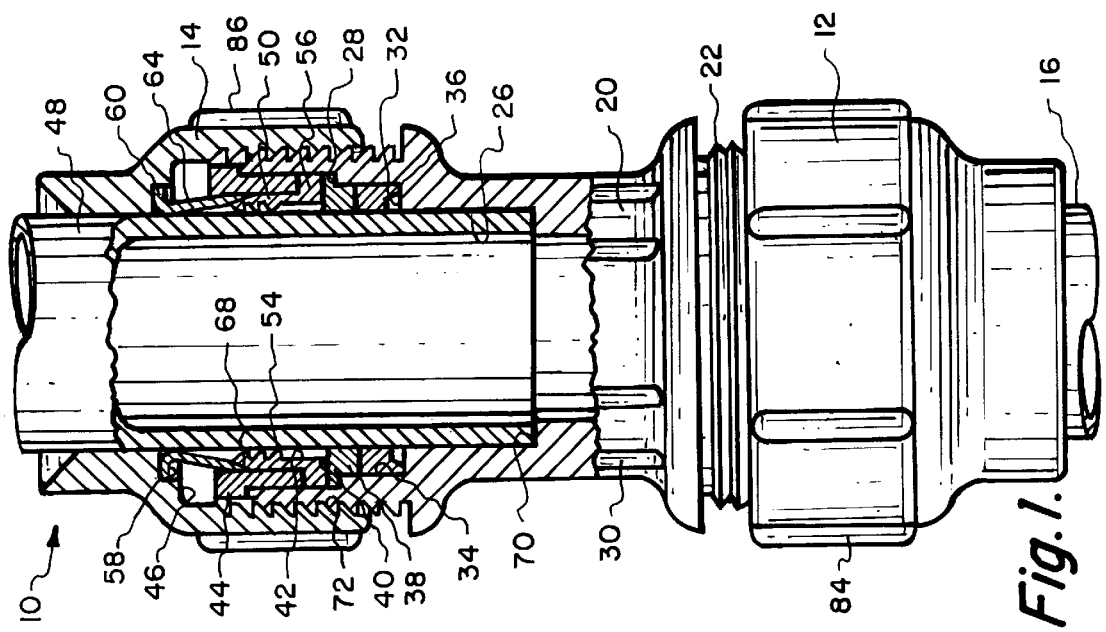
FIG. 1 is a longitudinal view, partly in cross-section of the pipe coupling of the present invention showing such installed with two aligned and separate pipe sections with the coupling in an untightened position that permits longitudinal movement of one of the pipe sections relative to the coupling.
Figure 3:
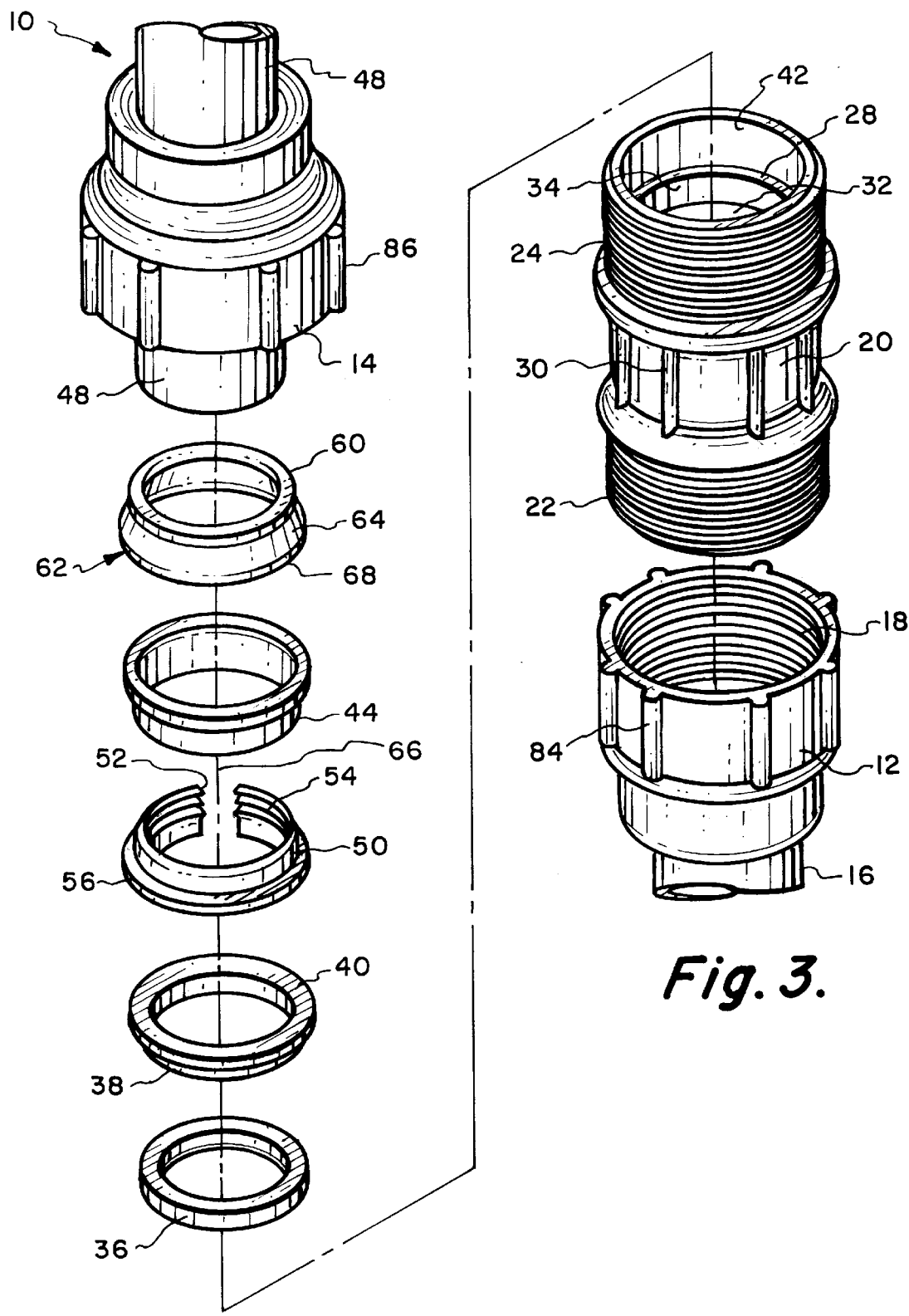
FIG. 3 is an exploded isometric view showing the different parts of the pipe coupling of the present invention which utilizes a first embodiment of grab ring.

The installing operation of the pipe coupling 10 of this invention as shown in FIGS. 1–3 is as follows: With the first pipe section 16 being fixedly secured to the connector 12, the externally threaded section 22 of the spool section 20 is then threaded into the internally threaded section 18. The retaining nut 14 has the wedge ring 62 mounted within the annular compartment 58 and extending into the internal chamber 46. Within the chamber 34 of the spool section 20, there is placed the sealing member 36 and the washer 38. Placed within the enlarged annular chamber 42 is the grab ring 50 and the back-up ring 44. The second pipe section 48 is then inserted into the spool section 20 until the end of the pipe section 48 abuts against the lower annular ledge 70 of the internal through passage 26. In this position, the sharpened free edge 68 of the wedge ring 62 starts to be wedged between the backup ring 44 and the grab ring 50. The inclination of the main section 64 of the wedge ring 62 is just sufficient so that sharpened free edge 68 is positioned at the junction between the back-up ring 44 and the grab ring 50. The pipe coupling 10 of this invention is now in the position as shown in FIG. 1.

The retaining nut 14 and the connector 12 are each to be held by an appropriate tool preventing such from rotation. Another tool is to be applied to the exterior surface of the spool section 20 with the ridges 30 functioning as a gripping device for the tool. The spool section 20 is then proceeded to be rotated in a tightening direction which will move the retaining nut 14 toward connector 12. The externally threaded section 22 will be totally threaded within the connector 12 with the internal threaded section 72 of the retaining nut 14 being threaded onto externally threaded section 24. As the tightening action continues, the main section 64 of the wedge ring 62 is forced further between the back-up ring 44 and the grab ring 50. The inclination of the main section 64 exerts a continuous bias against the grab ring 50 that causes the biting members 54 to imbed within the wall surface of the second pipe section 48. Normally, the grab ring 50 will be constructed of a hard, plastic material that is capable of deflecting to cause imbedding of the biting members 54. As the biting members 54 dig into the wall surface of the second pipe section 48, the grab ring 50 will have a tendency to decrease in diameter. This decrease in diameter is allowed for by the split 52.

Figure 4:
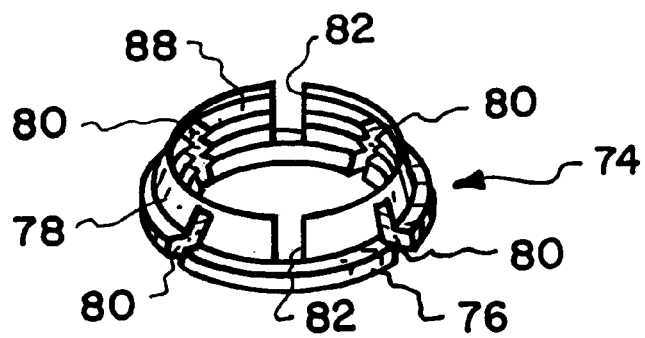
FIG. 4 is an isometric view of a second embodiment of grab ring that could be utilized instead of the first embodiment of grab ring shown in FIG. 3.
Figure 5:
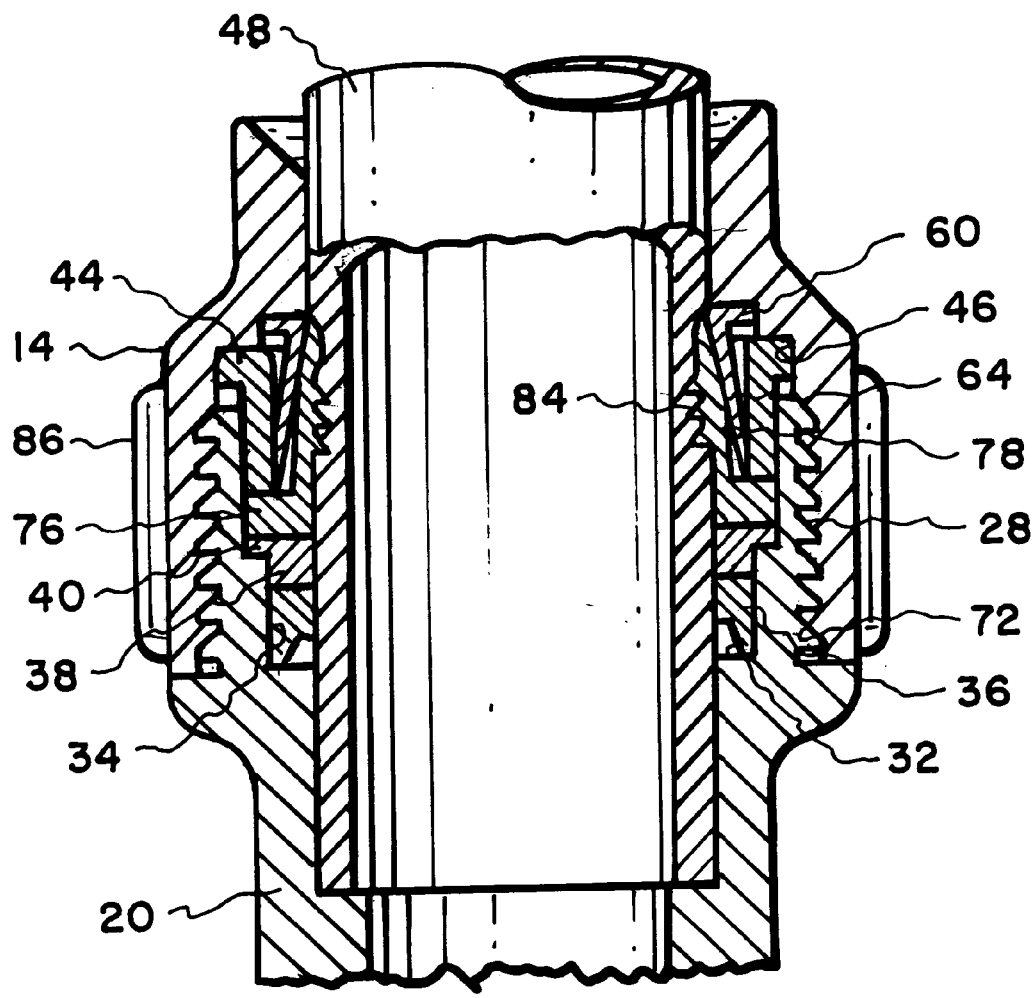
FIG. 5 is a view similar to FIG. 2 but with the second embodiment of grab ring.

Referring particularly to FIGS. 4 and 5, instead of using the split version of grab ring 50, there may be utilized a modified form 74 of grab ring. Grab ring 74 is not split all the way through and includes an annular base 76 and an annular grab section 78. There are formed in the grab ring 74 a plurality (four in number) of slots 80 which are open at the lower end of an annular fixed base 76 and extend up into the annular grab section 78. These slots 80 are equiangularly spaced apart. There are also a pair of diametrically opposed slots 82 which are open to the upper edge of the annular grab section 78 and extend in depth to the fixed base 76. As squeezing pressure is applied by the main section 64 of the wedge ring 62 to the grab ring 74, the slots 80 combined with slots 82 permit the annular grab section 78 of the grab ring 74 to readily deflect inwardly causing the biting members 88 to dig into the pipe section 48. The annular grab section is, in essence, divided into a pair of separate sections by the slots 82. The separate sections deflect toward each other by the pressure of the wedge ring 62. There are three rows of the biting members 88 within each separate section. When the pressure of the wedge ring 62 is released, the annular grab section 78 resiliently bounces back and the biting members 88 are removed from the imbedded position with the pipe section 48.

When the connector 12 has mounted thereon a tool (not shown) which is to prevent the connector 12 from rotating, the ridges 84 facilitate the frictional connection with the tool. In the same manner, the ridges 86 of the retaining nut 14 are to be used to prevent the retaining nut 14 from rotating.

With the pipe coupling 10 in the installed position, as shown in FIG. 2, fluid can be readily conducted in a leak-free manner between the first pipe section 16 and the second pipe section 48.

What is claimed is:

1. A pipe coupling for interconnecting a first pipe section which is slightly spaced apart from a second pipe section, each pipe section having a longitudinal center axis, each longitudinal center axis of the pipe sections being in substantial alignment, said pipe coupling comprising:

a connector, the first pipe section being inserted within said connector and fixedly secured thereto, said connector having an outer open end defining an internal bore which is surrounded by a first internally threaded section;

a spool section threadably connecting with said first internally threaded section;

a retaining nut mounted around the second pipe section, said retaining nut having a second internally threaded section, said second internally threaded section to engage with said said second externally threaded section;

a grab ring having a plurality of biting members, said grab ring surrounding the second pipe section, said grab ring being surrounded by said retaining nut;

a back-up ring mounted between said retaining nut and said grab ring;

a wedge ring connected to said retaining nut, said wedge ring having an annular main section that assumes an inclined position relative to said longitudinal center axis, said annular main section terminates in a sharpened free edge which is used to initiate installation of said wedge ring in its installed position by wedging said sharpened free edge between said back-up ring and said grab ring, said spool section being rotatable relative to said retaining nut and said connector which causes said connector and said retaining nut to move closer together which also causes said main section of said wedge ring to move linearly and be forced between said grab ring and said back-up ring to a further inserted position which forces said biting members into the second pipe section thereby locking together the first pipe section and the second pipe section in a fluid tight manner.

2. The pipe coupling as defined in claim 1 wherein:

said grab ring includes a plurality of separate sections each of which has said biting members, said separate sections being mounted on an annular base, said separate sections being deflectable relative to said annular base.

3. The pipe coupling as defined in claim 1 wherein:

said spool section having a first externally threaded section and a second externally threaded section, said first externally threaded section being oppositely threaded to said second externally threaded section, said first externally threaded section threadably connecting with said first internally threaded section, whereby when said spool section is rotated said spool section is moved linearly into a further engagement position with both said connector and said retaining nut.

4. The pipe coupling as defined in claim 3 wherein:

said spool section having an exterior surface which has a gripping means which facilitates connection with a tool for rotation of said spool section.

\* \* \* \* \*